United States Patent
Gomi et al.

[11] Patent Number: 5,912,298
[45] Date of Patent: *Jun. 15, 1999

[54] COMPOSITION FOR FLOOR POLISH

[75] Inventors: Tadashi Gomi; Kazunori Nakahara; Etsuko Yanase, all of Tokyo; Ken-ichi Nakamura, Tochigi, all of Japan

[73] Assignee: Yuho Chemicals, Inc., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/518,136

[22] Filed: Aug. 22, 1995

[30] Foreign Application Priority Data

Sep. 20, 1994 [JP] Japan ................................ 6-224436

[51] Int. Cl.$^6$ .............................. C08J 3/00; C08K 3/20; C08L 75/00; C08L 51/00

[52] U.S. Cl. ..................... 524/591; 524/539; 524/839; 524/840

[58] Field of Search .................. 524/591, 839, 524/840, 539

[56] References Cited

U.S. PATENT DOCUMENTS

| | | | |
|---|---|---|---|
| 4,017,662 | 4/1977 | Gehman et al. | 428/443 |
| 4,622,360 | 11/1986 | Gomi et al. | 524/507 |
| 5,319,018 | 6/1994 | Owens et al. | 524/556 |
| 5,541,265 | 7/1996 | Gomi et al. | 525/366 |

FOREIGN PATENT DOCUMENTS

| | | |
|---|---|---|
| A-47-14019 | 4/1972 | Japan. |
| A-57-117552 | 7/1982 | Japan. |
| A-62-205168 | 9/1987 | Japan. |
| A-63-23972 | 2/1988 | Japan. |
| B-64-11236 | 2/1989 | Japan. |
| A-2-219863 | 9/1990 | Japan. |
| A-4-325582 | 11/1992 | Japan. |
| A-5-5083 | 1/1993 | Japan. |
| A-5-263046 | 10/1993 | Japan. |
| A-6-25593 | 2/1994 | Japan. |
| WO 94/07959 | 4/1994 | Japan. |
| A-6-234912 | 8/1994 | Japan. |
| WO 94/07959 | 4/1994 | WIPO. |

OTHER PUBLICATIONS

Odian, G., Principles of Polymerization, 1981, pp. 20–25 and 279–281.

*Primary Examiner*—Patrick D. Niland
*Attorney, Agent, or Firm*—Griffin, Butler, Whisenhunt & Szipl, LLP

[57] ABSTRACT

Compositions for floor polish. Specifically, a composition for floor polish made by the two-step process including the steps of (1) providing water-borne polyurethane resin, preferably having 2–20 acid functional groups per urethane and having an acid value of 15–200 and a molecular weight of 10,000 to 1,000,000, and (2) reacting the polyurethane resin with a calcium compound, not complexed with amines or ammonia, in an amount sufficient to form 0.05 to 0.9 chemical equivalents of calcium crosslinkages relative to the acid functional groups of the polyurethane resin. The invention also includes a floor polish made by a three-step process including the steps of (1) providing an emulsion of a water-borne polyurethane resin as described above, (2) adjusting the pH of the emulsion to a pH value within the range of 4.5 to 9 by adding a base to the emulsion, and (3) reacting the water-borne polyurethane resin with a calcium compound as described above. The floor polish according the present invention has a number of superior properties, including gloss, recoatability, removability, detergent resistance, wear resistance and heal mark resistance.

10 Claims, No Drawings

500 5,912,298

COMPOSITION FOR FLOOR POLISH

BACKGROUND OF THE INVENTION

1. Technical Field of the Invention

The present invention relates to compositions for floor polish. More specifically, it relates to compositions for floor polish which can form tough coatings exhibiting good gloss without polishing by, for example, a polishing machine when they are applied to surfaces of floors and dried. The thus-formed coatings are capable of being easily removed with a chemical means.

2. Related Art

Compositions for floor polish to be applied to floors made of wood, concrete, vinyl tiles, rubber tiles or the like should be capable of forming tough coatings of excellent gloss when they are applied to surfaces of floors and dried, while the formed coatings should be easily removed by a physical or chemical means. In particular, compositions for floor polish comprising water-borne resins yield excellent gloss without any polishing treatments by a polishing machine or the like when they are applied to floor materials and hence they are called compositions for floor polish of the non-buffable type. Various properties are required for such compositions for floor polish. For example, coatings formed from these compositions after drying should have gloss, should hardly stain with black heel marks and should have good durability. Further, in addition to these properties, they should be detergent resistant to such an extent that gloss is not lost by treatments with ordinary detergents. The coating should be easily removed with a chemical means, but not with a physical means, when coatings are unacceptably stained or damaged. Because the durability and the removability of the coatings are inconsistent with each other, attempts have been made to reconcile the two properties to form tough coatings showing good removability.

To this end, compositions for floor polish comprising emulsified copolymers incorporated with polyvalent metals have been proposed (Japanese Patent Un-examined Publication (KOKAI), hereinafter referred to as "JP-A", No. 47-14019). However, those compositions have the drawback that, when those compositions comprising polyvalent metal complexes are applied and dried, amines or ammonia contained in the complexes as ligands are vaporized upon decomposition of the complexes to generate an odor of amines or ammonia. Further, the polyvalent metal complexes used for these compositions for floor polish are heavy metal complexes such as those of zinc, cobalt, cadmium, nickel, chromium, zirconium, tin, tungsten and aluminum. These complexes are undesirable from the viewpoint of the prevention of environmental pollution.

Instead of the use of metal complexes, a method in which zinc oxide is dispersed in a polymer emulsion has also been proposed (JP-A-57-117552). This method comprises a step of dispersing zinc oxide in an emulsion containing an acrylic copolymer by, for example, agitation to obtain a stable composition for floor polish which does not generate amine odor when it is dried. However, zinc used in the composition is a heavy metal and hence the problem, i.e., unfavorableness to environmental sanitation, has not been solved. In addition, since zinc oxide is very difficult to be solubilized, Zinc oxide hardly enters into the polymer oil particles in the emulsion, and if the emulsion is left stand for a long period of time, the zinc oxide is disadvantageously precipitated.

In order to solve the problem concerning the precipitation of zinc oxide, compositions obtained by reacting transition metals such as zinc with polymers at a specific temperature have been also proposed (JP-A-2-219863). However, the metals used in these composition are heavy metals and hence the problem of environmental pollution still remained. In addition, it was also disclosed in this patent document that non-heavy metals such as divalent alkali earth metals are not suitable as a cross-linking agent.

Recently, it has been reported that calcium can be used as a metal cross-linking agent instead of heavy metals such as those mentioned above. For example, JP-A-4-325582, JP-A-5-5083, PCT International Publication W094/7959 and JP-A-5-263046 disclose processes for producing calcium cross-linked compositions for floor polish through reactions of polymer emulsions obtained by polymerization of ethylenically unsaturated monomers with calcium. Further, JP-A-6-25593 discloses a process for producing calcium cross-linked compositions for floor polish through polymerization of calcium salts of monomers. However, those compositions for floor polish utilize polymers obtained by polymerization of ethylenically unsaturated monomers (acrylic resins) as a main resin component and it leads to a problem that satisfactory wear resistance and durability of coatings formed from these composition cannot necessarily be obtained.

To improve durability and wear resistance of coatings, there have been proposed compositions for floor polish utilizing water-borne polyurethane resins as a main resin component. For example, Japanese Patent Publication (KOKOKU), hereinafter referred to as "JP-B", No. 64-11236, JP-B-62-205168 and JP-B-63-23972 disclose compositions for floor polish comprising polyvalent metal complexes. However, there have not been known any processes where water-borne polyurethane resins are directly reacted with polyvalent metals to obtain compositions for floor polish.

An object of the invention is to provide compositions for floor polish capable of forming tough coatings without utilizing heavy metals. More specifically, the object of the present invention is to provide compositions for floor polish capable of forming coatings showing excellent durability and wear resistance and being free of heavy metal pollution by utilizing calcium as a metal cross-linking agent.

Another object of the invention is to provide compositions for floor polish capable of forming coatings which can be easily removed by a chemical means.

SUMMARY OF THE INVENTION

As a result of the present inventors' diligent research into the problems described above, it was found that compositions for floor polish capable of forming coatings showing excellent durability and wear resistance can be obtained by cross-linking water-borne polyurethane resins with calcium, which is not a heavy metal. It is also found that the coatings obtained from the compositions for floor polish described above can be easily removed by a chemical means and hence the compositions have markedly excellent properties as compositions for floor polish. The present invention has been completed based on these findings.

That is, the present invention provides compositions for floor polish comprising a water-borne polyurethane resin cross-linked with calcium wherein the water-borne polyurethane resin has an acid value of 15 to 200 and comprises 0.05 to 0.9 chemical equivalents of calcium cross-linkages relative to the acid functional groups of the polyurethane resin. As one preferred embodiment, the present invention provides the compositions for floor polish described above which comprise 0.3 to 0.6 chemical equivalents of calcium cross-linkages relative to the acid functional groups of the polyurethane resin.

As another aspect of the present invention, there is provided a process for producing compositions for floor polish comprising a water-borne polyurethane resin cross-linked with calcium wherein a water-borne polyurethane resin having an acid value of 15 to 200 is reacted with a calcium compound in an amount of 0.05 to 0.9 chemical equivalents relative to acid functional groups of the polyurethane resin. Further, also provided is a process where pH of the water-borne polyurethane resin emulsion is adjusted to a pH value within a range of 4.5 to 9 by adding a base prior to the reaction described above.

When the compositions for floor polish of the present invention are applied to surfaces of floors and dried, they yield tough resin coatings with excellent gloss and the formed coatings can be easily removed by a physical or chemical means. The compositions for floor polish of the present invention are characterized in that coatings formed from the compositions applied to flooring materials preferably provide excellent gloss without polishing by a polishing machine or the like. These compositions are classified as the non-buffable type of aqueous floor polishes according to the general rules of test methods for floor polishes of the Japan Floor Polish Industry Association Standard ("Proper Utilization of Aqueous Floor polishes", published by the Japan Floor Polish Industry Association, Oct. 30, 1984, page 56).

Polyurethane resins used for the present invention are water-borne polyurethane resins containing polyurethane resins bearing acid functional groups such as carboxylic acid, sulfonic acid, sulfate ester, phosphate ester groups and salts thereof in their polyurethane chains and they preferably have carboxylic acid and/or carboxylic acid salt groups. Polyurethane resins bearing two or more kinds of acid functional groups may also be used and, in such a case, it is preferred to use those bearing carboxylic acid and/or carboxylic acid salt groups in a higher ratio compared to the other acid functional groups. Bases for forming the salts may be amine compounds, ammonia, alkali metals and the like.

Such water-borne polyurethane resins as described above may be prepared as water-borne polyurethane resins of the water-dispersed type or water-solubilized type. For example, they can be preferably prepared by (1) upon preparation of polyurethane resins, adding diols and the like having acid functional groups to diols and diisocyanates, neutralizing the acid functional groups, if necessary, and carrying out a polymerization reaction, or (2) reacting urethane prepolymers having isocyanate groups at their ends with excess polyalkylamines to form polyurethane-urea-polyamines, which are then reacted with acid anhydrides such as cyclic dicarboxylic acid anhydrides. It is also possible to make these resins water-borne by adding emulsifiers.

The amount of acid functional groups contained in the polyurethane resins can be represented in terms of acid value (mg number of KOH necessary for neutralizing 1 g of solid resin). The water-borne polyurethane resins used for the present invention have an acid value within a range of 15 to 200, preferably, 30 to 100. When the acid value is below 15, it may become difficult to chemically remove coatings formed by applying the compositions for floor polish of the present invention. On the other hand, use of a water-borne polyurethane resin of an acid value exceeding 200 may lead to insufficient water resistance, detergent resistance, reapplicability and the like of resin coatings. When two or more kinds of water-borne polyurethane resins are used in combination, any water-borne polyurethane resins having an acid value outside the range specified above can be used for the production of the composition for floor polish of the present invention so long as the acid value of the mixed resins as a whole can be adjusted within the range mentioned above by adding other polyurethane resins having different acid values.

Any water-borne polyurethane resins can be used for the present invention irrespective of their molecular weights, molecular structures and preparation methods (polymerization methods, presence or absence of solvent, kind of solvent etc.). Further, water-borne polyurethane copolymer resins obtained by copolymerizing water-borne polyurethane resins with one or more vinyl polymers of acrylic acid, acrylates, methacrylic acid, methacrylates, vinyl chloride, styrene, vinyl acetate and the like and water-borne polyurethane resins obtained through reactions between copolymers of the vinyl monomers mentioned above and water-borne polyurethane resins and the like may also be used.

Examples of the water-borne polyurethane resins suitably used for the production of the compositions according to the present invention are those having an acid value within the range specified above and prepared by polymerization in the absence of tertiary amines. Such polyurethanes may have 2 to 20 acid functional groups per repeating unit of the polyurethanes and may generally be prepared as aqueous resin emulsions containing 5 to 60% by weight of solid content. Acid functional groups present in these aqueous resin emulsions containing water-borne polyurethane resins may be totally or partially dissociated. These polyurethane resins have a molecular weight in a range of about 10,000 to about 1,000,000, preferably 30,000 to 200,000, particularly preferably about 50,000 to about 100,000. When two or more kinds of polyurethane resins are used as a mixture, they can be used in a combination such that the mixture of the two or more of polyurethanes prepared by polymerization has an acid value within the range specified above.

These polyurethane resins can be prepared by, for example, preparing prepolymers from diol compounds such as polypropylene glycols, diisocyanate compounds such as isophorone diisocyanate and polyhydroxycarboxylic acids such as dimethylolpropionic acid in an organic solvent such as acetone, adding a base compound such as sodium hydoroxide and, if necessary, a desired surfactant to the prepolymers to emulsify them, polymerizing the prepolymers with chain extending agents such as hexamethylenediamine and evaporating solvent under reduced pressure.

Examples of the diol compounds are ethylene glycol, diethylene glycol, triethylene glycol, 1,2-propylene glycol, trimethylene glycol, 1,3-butylene glycol, tetramethylene glycol, hexamethylene glycol, hydrogenated bisphenol A, low molecular weight glycols such as ethylene oxide or propylene oxide adducts of bisphenol A, polyols such as polyethylene glycols, polyethers such as polypropylene glycols, polyesters such as condensates of ethylene glycol and adipic acid, condensates of hexanediol and adipic acid, condensates of ethylene glycol and phthalic acid and polycaprolactones. Examples of the chain extending agents are polyols such as ethylene glycol and propylene glycol, diamines such as ethylenediamine, propylenediamine, hexamethylenediamine, tolylenediamine, xylylenediamine, diphenyldiamine, diaminodiphenylmethane, diaminocyclohexylmethane, piperazine and isophoronediamine and water.

Examples of the diisocyanates are 2,4-tolylene diisocyanate, 2,6-tolylene diisocyanate, m-phenylene diisocyanate, xylylene diisocyanate, tetramethylene diisocyanate, hexamethylene diisocyanate, lysine diisocyanate, 1,4-cyclohexylene diisocyanate, 4, 4'-dicyclohexylmethane diisocyanate, 3,3'-dimethyl-4,4'-biphenylene diisocyanate, 3,3'-dimethoxy-4,4'-biphenylene diisocyanate, 1,5-naphthalene diisocyanate, 1,5-tetrahydronaphthalene diisocyanate and isophorone diisocyanate.

Examples of the polyhydroxycarboxylic acids are 2,2-dimethylolpropionic acid, 2,2-dimethylolbutyric acid and 2,2-dimethylolvaleric acid. Examples of the base compound used in the preparation of the polyurethanes are sodium hydroxide, potassium hydroxide, lithium hydroxide, monoethanolamine, diethanolamine and triethanolamine. These glycols, chain extending agents, diisocyanates and polyhydorxycarboxylic acids may be used as mixtures in a desired ratio. The examples of these components listed above are mentioned merely for exemplary purposes. Therefore, the components are not limited to those specifically listed and glycols, chain extending agents, diisocyanates and polyhydroxy-carboxylic acids well known to those skilled in the art may be used as desired.

The compositions for floor polish of the present invention are characterized in that calcium cross-linkages are formed in the water-borne polyurethane resins described above. The calcium cross-linkages are formed in a range of 0.05 to 0.9, preferably 0.3 to 0.6 chemical equivalents relative to the acid functional groups of the water-borne polyurethane resins. Examples of the calcium compounds used for forming calcium cross-linkages include calcium oxide, calcium hydroxide, calcium carbonate, calcium acetate, calcium chloride and mixtures thereof, but they are not limited to these compounds. Among these calcium compounds, calcium oxide, calcium hydroxide and calcium carbonate are preferably used. Further, these calcium compounds may be used in combination with calcium complex compounds such as calcium glycine ammonia, calcium malate ammonia and calcium carbonate ammonia or a small amount of metal compounds or metal complex compounds of zinc, cobalt, cadmium, nickel, chromium, zirconium, tin, tungsten, aluminum or the like.

Commercially available calcium compound powders may be used as the above-described calcium compounds, and those powders are preferably of a fine grade having a particle size of 0.2 to 0.5 microns. By adding the calcium compounds described above to the aqueous resin emulsions containing the water-borne polyurethane resins and mixing them, the acid functional groups are reacted with calcium ions to form calcium cross-linkages. While it is not intended to be bound by any specific theory, it is believed that the reaction of the calcium compounds and the acid functional groups proceeds in the polyurethane resin oil particles after the calcium compounds are taken into the polymer oil particles. Then, when the compositions for floor polish of the present invention are applied to floors, the oil particles containing polyurethane resins cross-linked with calcium are fused with one another to form tough resin coatings. Thus, the calcium cross-linkages are substantially not formed between the oil particles present in the emulsions and hence the aqueous emulsions can be stably maintained. Therefore, the compositions for floor polish of the present invention can be stored stably for a long period of time.

If the amount of calcium cross-linkages is less than the above-described range, the toughness of the resulting coatings may be undesirably lowered and hence it is not preferred. If the amount of the calcium cross-linkages is more than the above range, product stability and leveling properties may be deteriorated and hence it is not preferred. In order to disperse the calcium compounds in the aqueous polyurethane resin emulsions to cause the reaction between the compounds and the acid functional groups of the polyurethane resins, for example, a prescribed amount of calcium compound powders may be directly added to the aqueous polyurethane resin emulsions and mixed by stirring, or aqueous solutions or aqueous dispersions containing the calcium compounds separately prepared may be added to the aqueous polyurethane resin emulsions. The aqueous solutions and dispersions may be prepared by adding the calcium compounds to aqueous solvents in a ratio of 10 to 50% by weight and stirring the solvents to dissolve or disperse the calcium compounds. The stirring can be carried out by using homogenizers, kneaders or the like.

The above reaction process is carried out either at room temperature or under heating. For example, the reaction is carried out while the aqueous polyurethane resin polymer emulsions added with the calcium compounds are kept at a temperature around the glass transition temperatures (Tg) of the polyurethane resins or at temperatures higher than Tg. The reaction may be carried out at temperatures higher than Tg by about 5 to 40° C., preferably about 10° C . The reaction may also be carried out at temperatures lower than Tg by about 5 to 60° C., but, in such a case, it may require several tens of hours to complete the reaction. When the calcium compounds are used in an amount of about 0.2 to 0.5 chemical equivalents relative to the acid functional groups of the polyurethane resins, the reaction may be carried out at room temperature and, when the calcium compounds are used in an amount of more than 0.5 chemical equivalents, the reaction is preferably carried out under heating. If the reaction temperature is too low, it becomes difficult for the calcium compounds to be taken up into the polyurethane resin particles in the emulsions and hence it becomes likely that the calcium compounds do not react sufficiently with the polyurethane resins. In such cases, since the calcium compounds are occasionally precipitated in the aqueous polyurethane resin emulsions, the reaction should be carried out at higher temperatures.

The reaction described above can be continued until compositions in the form of uniform emulsions are obtained. More specifically, the reaction described above can be continued until precipitation of calcium compounds used disappears from the emulsions. For example, it is preferred that the reaction is continued so that the compositions for floor polish of the present invention prepared in the above-described process have minimal film-forming temperatures higher, by 5° C. or more, preferably 10° C. or more, than those of the aqueous polyurethane emulsions before the calcium cross-linking reaction. In general, when 40% or more of the acid functional groups in the water-borne polyurethane resins are cross-linked with calcium, the minimal film-forming temperatures are elevated by 10° C. or more and therefore the reaction may be carried out by using the minimal film-forming temperatures as a measure of the reaction.

The reaction of the calcium compounds and the water-borne polyurethane resins may also be carried out by adding bases to the aqueous polyurethane resin emulsions to adjust pH of the emulsions to a range of 4.5 to 10 and then adding the calcium compounds. For example, the pH of the aqueous polyurethane resin emulsions is adjusted to a range of 4.5 to 10, preferably 6 to 9, more preferably 7.5 to 8.5 and then the emulsions are stirred for, for example, about 30 minutes to 2 hours to carry out the reaction of the polyurethane resins and the calcium compounds. Examples of bases which may be suitably used are ammonia and amines. Examples of the amines include diethylaminoethanol, monoethanolamine, diethylamine and triethylamine.

These bases may be added during the production of the water-borne polyurethane resins, but they are preferably added to the aqueous resin emulsions after the polymerization. For example, when an aqueous ammonia solution is added as the base, a necessary amount of an aqueous ammonia solution containing not more than 10% by weight of ammonia may be added all at once or portionwise in several times over 5 to 15 minutes to the aqueous polyurethane resin emulsions so that the emulsions have a pH value within the above-described range. When the aqueous ammonia solution is added all at once, the aqueous polyurethane resin emulsions are preferably stirred vigorously. When strongly hydrophobic polyurethane resins are used, it is preferred to adjust the pH of the emulsions within a range of from 8 to 9. When strongly hydrophilic polyurethane resins are used, it is preferred to adjust the pH within a range of from the 4.5 to 8. If the pH of the resin emulsions after the addition of base exceeds 10, the odor of ammonia or amines used as the base becomes significant and hence it is not preferred.

Though it is not intended that the inventors be bound by any specific theory, it is believed that, after the addition of the base and agitation for 30 minutes to 2 hours, the polymer oil particles in the polyurethane resin emulsions are swelled and the acid functional groups of the polyurethane resins are oriented on the surfaces of the oil particles. These acid functional groups can easily react with the calcium compounds to efficiently form calcium cross-linkages. The agitation may be carried out so that the resin emulsions after the addition of the base have minimal film-forming temperatures lower than those of the resin emulsions before the addition of the base by 5° C. or more, preferably by 10° C. or more. When a large amount of the base is used, the reaction of the water-borne polyurethane resins and the calcium compounds may be carried out at room temperature and, when a small amount of the base is used, the reaction may be carried out under heating.

The compositions for floor polish of the present invention may contain, in addition to the component described above, water-soluble resins selected from synthetic resin emulsions obtained by copolymerization of one or more vinyl monomers such as acrylic acid, acrylic acid esters, methacrylic acid, methacrylic acid esters, styrene, α-methylstyrene, vinyl chloride, vinyl acetate, ethylene and propylene; water-soluble polyester resins; water-soluble epoxy resins; waxes such as polyethylene waxes and polyethylene/acrylate waxes; and mixture thereof. In this case, the water-borne polyurethane resins and the water-soluble resins mentioned above may be mixed in a dry weight ratio of 1:20 to 6:1.

If desired, the composition for floor polish of the present invention may further contain waxes such as paraffins and montans; alkali-soluble resins such as rosin-modified maleic acid resins and styrene/maleic acid resins; plasticizers such as dibutyl phthalate and tributoxyethyl phosphate; film-forming agents such as diethylene glycol monoethyl ether and dipropylene glycol monomethyl ether; leveling agents such as trialkoxyalkyl phosphate; and fluorine-containing surfactants. These components may be added to the aqueous polyurethane resin emulsions directly or as aqueous dispersions thereof by themselves or together with the calcium compounds.

The compositions for floor polish of the present invention, which are prepared as described above, are preferably prepared to have a final pH of from 6 to 9. If the pH is lower than 6, product stability and leveling property of films formed by applying the composition tend to be deteriorated. If the pH of the coating compositions is higher than 9, recoatability of the compositions for floor polish tends to deteriorate and the odor of ammonia and amines upon drying of the composition becomes strong, which is not preferred. In order to adjust the pH of the compositions at the final step of the production, bases such as alkali metal hydroxides or acids such as carbon dioxide gas and acetic acid may be used in addition to the bases described above. These pH adjusting agents may be optionally added in a necessary amount after the reaction of the calcium compounds and the polyurethane resins has been completed.

The compositions for floor polish of the present invention are preferably prepared to contain about 3 to 40% by weight of the polyurethane resins and about 5 to 50% by weight total resins. The compositions for floor polish of the present invention may be applied to surfaces of floors made of, for example, wood, concrete, rubber tiles, vinyl tiles or linoleum tiles once or several times and dried at a temperature higher than their minimal film-forming temperatures. By the application method described above, resin coatings having good gloss and durability can be obtained. The coatings can be easily removed by applying a removing agent which is prepared by dissolving amines, alkali metal hydroxides, chelating agents, surfactants and the like in water to coatings to be removed and rubbing them by means of electric polishers provided with pads or the like.

The compositions for floor polish of the present invention yield, after application, tough resin coatings with excellent gloss. The resin coatings are excellent in water resistance, durability and detergent resistance and do not lose their gloss even after use for a long period of time. On the other hand, the coatings formed can be easily removed by chemical means. Further, the compositions for floor polish of the present invention are free of environmental pollution, since they do not contain heavy metals.

The present invention will be further illustrated by referring to the following working examples, but the present invention is not limited to these examples. The term "effective component" referred to in the examples means the content (concentration) of each resin (unit: % by weight).

EXAMPLES

Reference Example 1

Preparation of Water-borne Polyurethane Resin

A reaction vessel equipped with a reflux cooler, a thermometer and an agitator was charged with 49 g of polypropylene glycol (molecular weight: 1,000), 176 g of dicyclohexylmethane diisocyanate, 70 g of dimethylolpropionic acid and 196 g of N-methylpyrrolidone, and a urethane-forming reaction was conducted to form prepolymers while the vessel was maintained at 80 to 100° C. Then, after the prepolymers were neutralized by adding 48 g of triethylamine, 5.0 g of hexamethylenediamine was added to the prepolymers and a macromolecule-forming reaction was conducted by adding distilled water and maintaining temperature within the vessel equal to or below 35° C. to yield water-borne polyurethane resin C. By the completion of the reaction, 456 g in total of distilled water was added. In the same manner as described above, water-borne polyurethane resins A, B, D, E and F were prepared using the materials and their respective amounts as shown in Table 1.

TABLE 1

| Component | Resin | | | | |
|---|---|---|---|---|---|
| | A | B | C | D | E |
| Polypropylene glycol (Molecular weight: 1000) | 209 | — | 49 | 29 | 11 |
| Olester Q-5001E * | — | 146 | — | — | — |
| Dimethylolpropionic acid | 14 | 35 | 70 | 106 | 130 |
| Isophorone diisocyanate | — | 114 | — | — | — |
| Dicyclohexylmethane diisocyanate | — | — | 176 | — | — |
| Tolylene diisocyanate | 73 | — | — | 161 | 159 |
| Hexamethylenediamine | 5 | 5 | 5 | 4 | — |
| Triethylamine | 10 | 24 | 48 | 72 | 98 |
| N-methylpyrrolidone | 207 | — | 196 | 188 | 181 |
| Methyl ethyl ketone | — | 202 | — | — | — |
| Distilled water | 482 | 473 | 456 | 440 | 421 |
| Total | 1000 | 1000 | 1000 | 1000 | 1000 |
| Acid value of solid resin | 20 | 49 | 98 | 148 | 181 |

* Olester Q-5001E is a trade name of a polyesterpolyol (molecular weight: 1,000) available from Mitui Toatsu Chemicals, Inc.

Example

Compositions for floor polish of the present invention (Compositions 1 to 8) and comparative compositions for floor polish (Compositions 9 and 10) shown in Table 2 below were prepared.

(Note 1) A vessel provided with an agitator was charged with 54.0 g of water and added with 10 g of zinc oxide portionwise with agitation to disperse the zinc oxide in the water. Then, 18 g of 28% aqueous ammonia and 18 g of carbonic acid/ammonia were added successively to the reaction mixture and agitation was continued until they were dissolved to form zinc carbonate ammonia solution (effective component of zinc: 8.0337%).

(Note 2) Acrylic resin emulsion having a monomer composition of 15% methacrylic acid, 30% butyl acrylate and 55% methyl methacrylate and effective component of 40%, which was obtained by a conventional emulsion polymerization method using sodium laurylsulfate.

(Note 3) Acrylic resin emulsion having a monomer composition of 30% styrene, 10% methacrylic acid, 30% butyl acrylate and 30% methyl methacrylate and effective component of 40%, which was obtained by a conventional emulsion polymerization method using sodium laurylsulfate.

(Note 4) Low molecular weight acrylic emulsion available from Rohm & Haas Company (Trade name: Primal B-644, effective component: 42%)

(Note 5) Polyethylene wax emulsion available from Toho Chemical Industry Co.,Ltd. (Trade name: Hytec E-4B, non-volatile component: 40%).

(Note 6) Acrylic wax emulsion available from Nippon Shokubai Co., Ltd. (Trade name: CX-ST200, non-volatile component: 40%)

TABLE 2

| | | Composition of the present invention | | | | | | | | Comparative composition | |
|---|---|---|---|---|---|---|---|---|---|---|---|
| | | 1 | 2 | 3 | 4 | 5 | 6 | 7 | 8 | 9 | 10 |
| | Reference Example | | | | | | | | | | |
| | A | 40.00 | | | | 36.67 | 50.00 | | 20.00 | | |
| | B | | 53.33 | | | | | 83.33 | 25.00 | 53.33 | 83.33 |
| | C | | | 33.33 | 33.33 | | | | | | |
| | D | | | | 33.33 | | 13.33 | | | | |
| | E | | | | | 20.00 | | | 5.00 | | |
| Cross-linking agent | Calcium hydroxide | 0.032 | | | | 0.172 | | 0.243 | | | |
| | Calcium oxide | | 0.118 | | | | | | | | |
| | Calcium carbonate | | | 0.350 | | | 0.238 | | 0.203 | | |
| | Calcium glycine | | | | 1.738 | 0.877 | | | | | |
| | Zinc carbonate ammonia (Note 1) | | | | | | | | | 1.71 | |
| | Acrylic emulsion (Note 2) | 10.00 | | 10.00 | | | | | | | |
| | Styrene/acrylic emulsion (Note 3) | | | 5.00 | 20.00 | | | | | | |
| | Alkali-soluble resin (Note 4) | 4.76 | 2.38 | | | | | | | 2.38 | |
| | Polyethylene wax (Note 5) | | 7.50 | 10.00 | 5.00 | 5.00 | 2.50 | | | 7.50 | |
| | Acrylic wax (Note 6) | 5.00 | | | | 5.00 | | | | | |
| Fusing agent/ | Ethyl carbitol | 5.33 | 4.00 | 4.00 | 2.27 | 5.33 | 2.27 | 2.27 | 2.27 | 4.00 | 2.27 |
| | Dipropylene glycol monomethyl ether | | | | 2.27 | | 1.14 | | | | |
| Plasticizer | Tributoxyethyl phosphate | 1.33 | 1.33 | 2.00 | 2.66 | 1.33 | 1.33 | 1.67 | 1.33 | 1.33 | 1.67 |
| | Dibutyl phthalate | 0.67 | | | | | | | | | |
| | 2-Pyrrolidone | | | | | | | 1.67 | | | 1.67 |
| | Fluorine-containing surfactant (Note 7) | 0.04 | 0.04 | 0.04 | 0.04 | 0.04 | 0.04 | 0.04 | 0.04 | 0.04 | 0.04 |
| | Dispersing agent (Note 8) | 0.25 | 0.25 | 0.25 | 0.25 | 0.25 | 0.25 | 0.31 | 0.20 | 0,25 | 0.31 |
| | Water | 32.588 | 31.052 | 35.030 | 32.442 | 25.331 | 28.902 | 10.467 | 45.957 | 29.460 | 10.710 |

(Note 7) Fluorine-containing anionic surfactant available from Dai-Nippon Ink & Chemicals, Inc. (Trade name: Megafac F-812; effective component: 15%).

Performance Evaluation

Results of performance evaluation of the compositions for floor polish described above are shown in Table 3.

TABLE 3

|  | Composition of the present invention | | | | | | | | Comparative composition | |
| --- | --- | --- | --- | --- | --- | --- | --- | --- | --- | --- |
|  | 1 | 2 | 3 | 4 | 5 | 6 | 7 | 8 | 9 | 10 |
| Gloss (Note 9) | 70.2 | 70.4 | 76.1 | 78.5 | 71.7 | 73.4 | 76.8 | 68.1 | 67.3 | 60.2 |
| Recoatability (Note 10) | Excellent | Excellent | Excellent | Excellent | Excellent | Excellent | Excellent | Excellent | Excellent | Bad |
| Removability (Note 11) | Excellent | Excellent | Excellent | Excellent | Excellent | Excellent | Excellent | Excellent | Good | Bad |
| Detergent resistance (Note 12) | Excellent | Excellent | Excellent | Excellent | Excellent | Excellent | Excellent | Excellent | Excellent | Bad |
| Wear resistance (Note 13) | 7.1 | 6.2 | 7.8 | 7.5 | 6.4 | 6.6 | 5.2 | 5.8 | 6.8 | 7.8 |
| Heel mark resistance (Note 14) | 6 | 1 | 4 | 9 | 2 | 3 | 8 | 7 | 5 | 10 |

(Note 9) Determined by the method of Floor Polish Test Method JIS K3920: Gloss (three time application).
(Note 10) Determined by the method of Floor Polish Test Method JIS K3920: Preparation of test piece, adjustment of coating by gauge (aqueous floor polish polymer type) provided that drying time after first application was 30 minutes after which second application was performed, then third application was performed in the same manner and slidability of applicator, increase of gloss and finished condition of coatings are evaluated by observing them macroscopically.
(Note 11) Determined by the method of Floor Polish Test Method JIS K3920: Removability.
(Note 12) Determined by the method of Floor Polish Test Method JIS K3920: Detergent resistance.
(Note 13) Test composition is applied to substrate five times in the same manner as in the method of Floor Polish Test Method JIS K3920: Preparation of test piece, adjustment of coating by gauge (aqueous floor polish polymer type). Then, the test piece is dried and left for 168 hours at room temperature and wear is determined by T-bar tester (wear wheel: CS-17, load: 500 g, cycle number: 300). Wear loss is represented in terms of mg.
(Note 14) Determined by the method of Floor Polish Test Method JIS K3920: Heel mark resistance.

We claim:

1. A process for preparing compositions for floor polish comprising the steps of providing water-borne polyurethane resin having 2 to 20 acid functional groups per urethane the and having an acid value of 15 to 200 and molecular weight of 10,000 to 1,000,000, and reacting the polyurethane resin with a calcium compound, not complexed with amines or ammonia, in an amount sufficient to form 0.05 to 0.9 chemical equivalents of calcium cross-linkages relative to the acid functional groups of the polyurethane resin.

2. A process of claim 1 wherein the calcium compound is reacted in an amount of from 0.3 to 0.6 chemical equivalents relative to the acid functional groups of the polyurethane resin.

3. A process of claim 1 wherein the water-borne polyurethane resin has an acid value of from 30 to 100.

4. A process of claim 1 wherein the water-borne polyurethane resin has a molecular weight of from 30,000 to 200,000.

5. A composition for floor polish obtained by the process comprising the steps of providing a water-borne polyurethane resin having 2 to 20 acid functional groups per urethane the and having an acid value of 15 to 200 and molecular weight of 10,000 to 1,000,000, and reacting the polyurethane resin with a calcium compound, not complexed with amines or ammonia, in an amount sufficient to form 0.05 to 0.9 chemical equivalents of calcium cross-linkages relative to the acid functional groups of the polyurethane resin.

6. A process for preparing compositions for floor polish comprising the steps of:
(1) providing an emulsion of a water-borne polyurethane resin having 2 to 20 acid functional groups per urethane the and an acid value of 15 to 200 and molecular weight of 10,000 to 1,000,000;
(2) adjusting the pH of the emulsion to a pH value within a range of 4.5 to 9 by adding a base to the emulsion, and
(3) reacting the water-borne polyurethane resin with a calcium compound, not complexed with amines or ammonia, in an amount of 0.05 to 0.9 chemical equivalents relative to the acid functional groups of the polyurethane resin.

7. A composition for floor polish obtained by a process comprising the steps of:
(1) providing an emulsion of a water-borne polyurethane resin having 2 to 20 acid functional groups per urethane the and an acid value of 15 to 200 and molecular weight of 10,000 to 1,000,000;
(2) adjusting the pH of the emulsion to a pH value within aL range of 4.5 to 9 by adding a base to the emulsion, and
(3) reacting the water-borne polyurethane resin with a calcium compound, not complexed with amines or ammonia, in an amount of 0.05 to 0.9 chemical equivalents relative to the acid functional groups of the polyurethane resin.

8. A process of claim 6 wherein the calcium compound is reacted in an amount of from 0.3 to 0.6 chemical equivalents relative to the acid functional groups of the polyurethane resin.

9. A process of claim 6 wherein the water-borne polyurethane resin has an acid value of from 30 to 100.

10. A process of claim 6 wherein the water-borne polyurethane resin has a molecular weight of from 30,000 to 200,000.

* * * * *